June 19, 1951 M. J. E. GOLAY 2,557,096
RADIATION DETECTING DEVICE
Filed Sept. 29, 1947 3 Sheets-Sheet 2
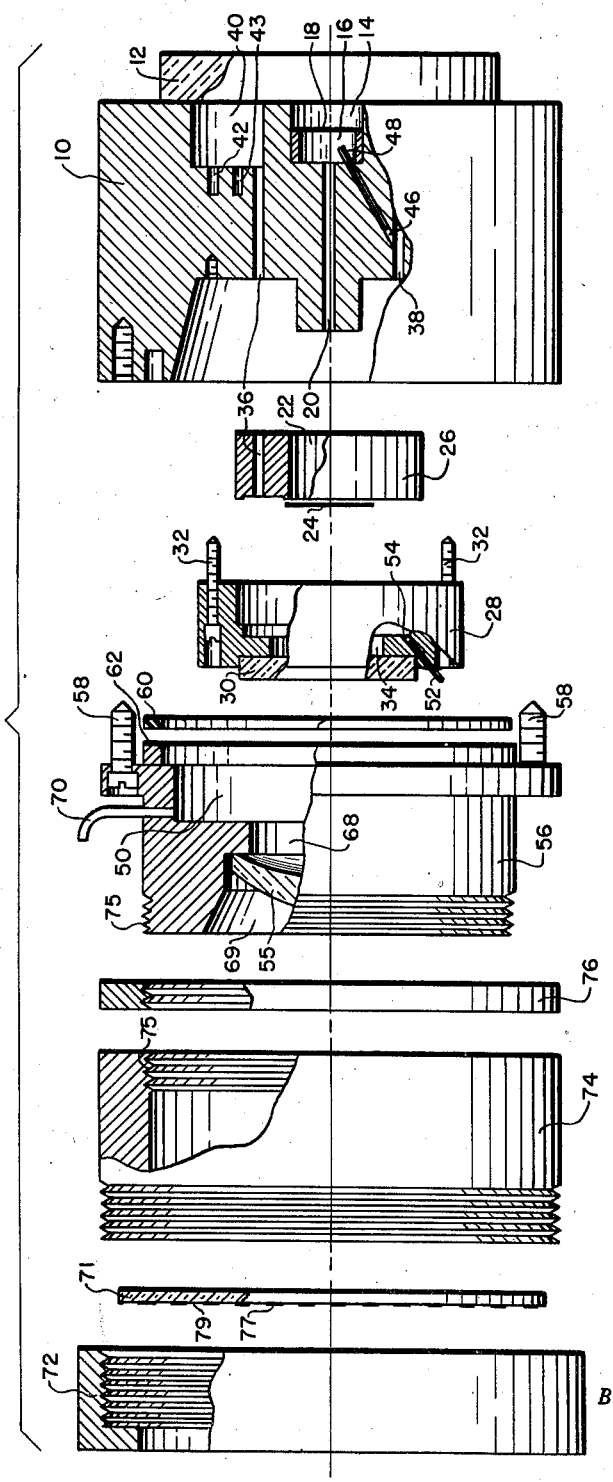
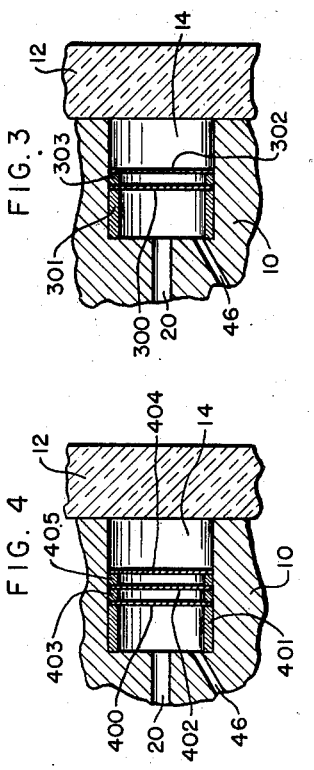
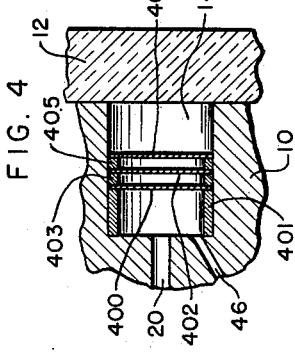
*INVENTOR.*
MARCEL J.E. GOLAY
BY Harry M. Saragovitz
ATTORNEY June 19, 1951  M. J. E. GOLAY  2,557,096
RADIATION DETECTING DEVICE
Filed Sept. 29, 1947  3 Sheets-Sheet 3
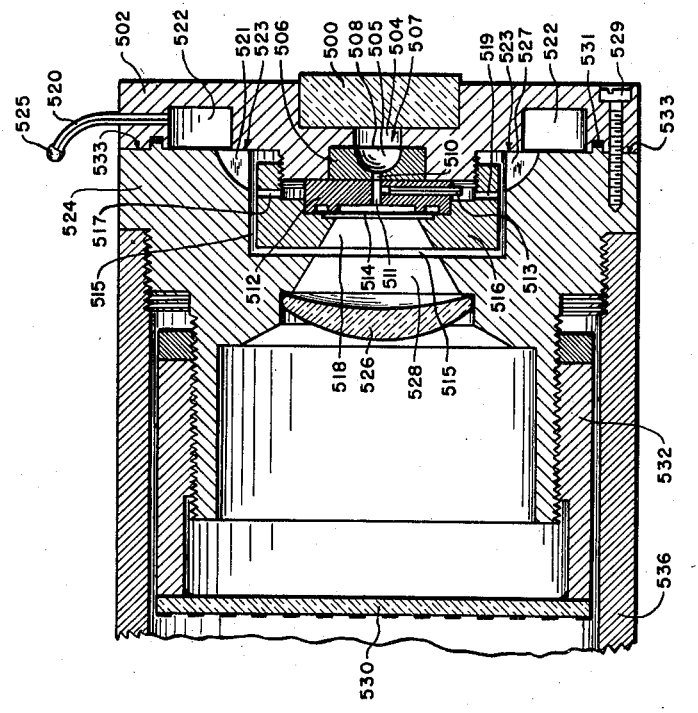
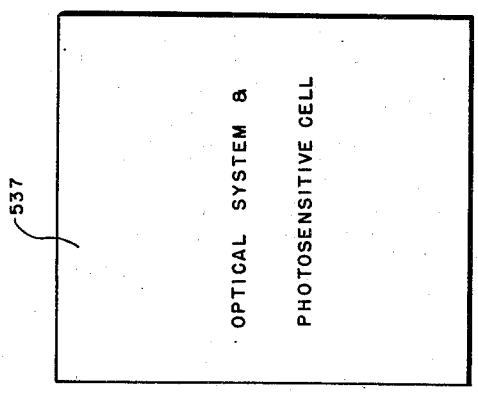
FIG. 5
INVENTOR.
MARCEL J. E. GOLAY
BY
ATTORNEY Patented June 19, 1951

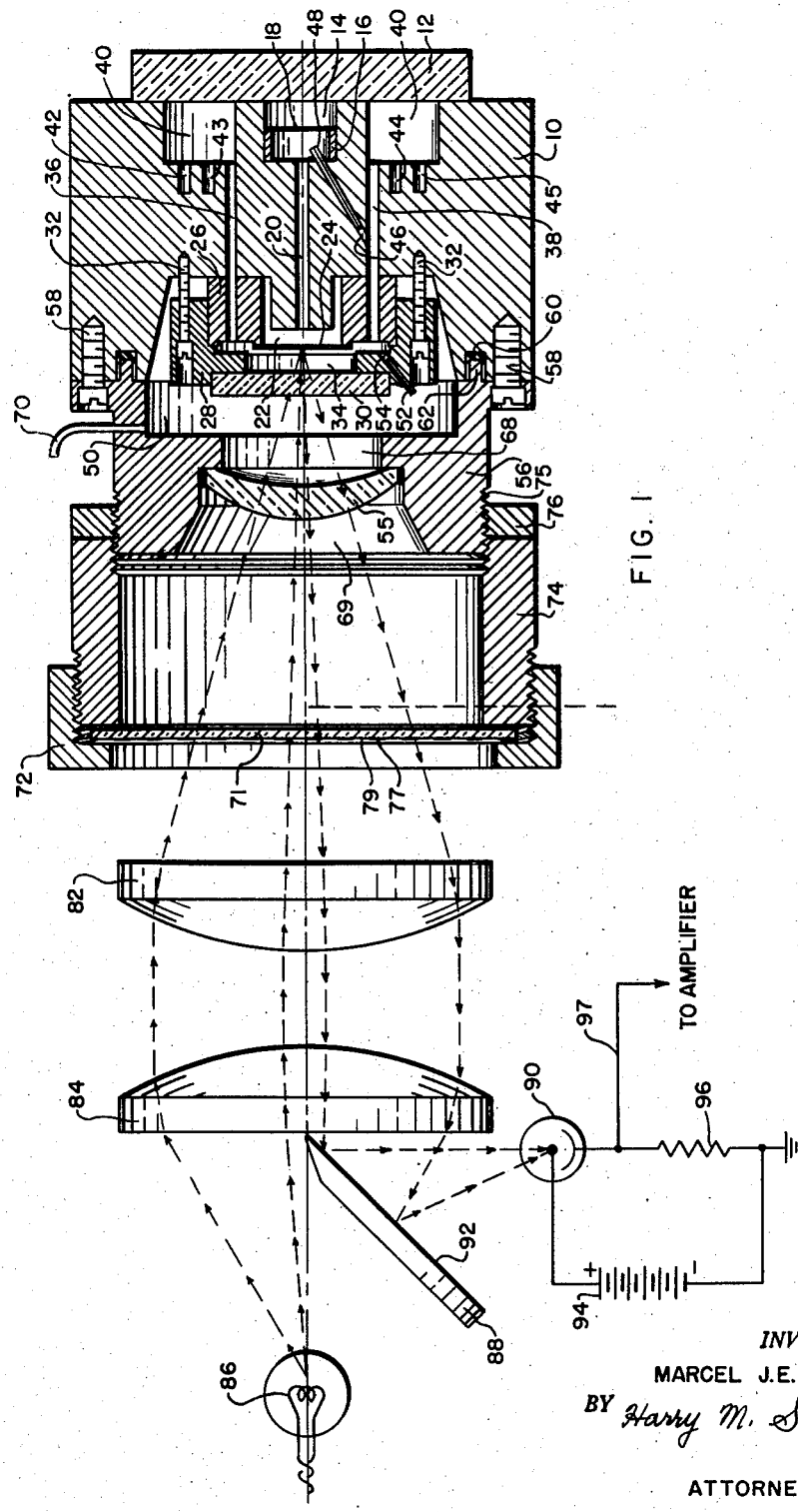

2,557,096

UNITED STATES PATENT OFFICE 2,557,096

RADIATION DETECTING DEVICE

Marcel J. E. Golay, West End, N. J.

Application September 29, 1947, Serial No. 776,754

32 Claims. (Cl. 250—83.3)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radiation detection and more particularly to the detection and measurement of infra-red radiation.

This application is a continuation-in-part of the co-pending application Serial No. 518,959, filed January 20, 1944, now abandoned, for Radiation Detecting Device.

According to conventional practice, the detection and measurement of infra-red radiation is usually accomplished by means of an infra-red detecting device such as a thermopile or bolometer. The inertia of the aforementioned devices is well known to those familiar with the art.

Attempts have been made to overcome the inertia inherent in bolometer and thermopile instruments, without sacrificing their sensitivity, by replacing them with an instrument utilizing the heating of a gas in a pneumatic system, and causing the expansion of the gas to deflect a membrane. The deflection of the membrane is detected by measuring electrically the resulting change in the electrostatic capacity between the membrane and a closely juxtaposed fixed metallic surface, the latter measurement forming a measurement of the quantity of the intercepted radiation. Examples of such devices are disclosed in the U. S. patent to H. V. Hayes, 1,954,204, April 10, 1934, and in the U. S. patent to William M. Hall, 2,115,578, April 26, 1938.

The devices of this type gave a certain increase in speed of response over the bolometers and thermopiles then known to the art, although the time constant of such systems was still of the order of magnitude of a tenth of a second. Furthermore, the electrical outputs of these devices was still so low that the problems presented by electronic amplification of these outputs required an inordinate amount of care for their solution. Also, the old devices were microphonic and hypersensitive to mechanical vibrations.

The instant invention discloses a radiation detection device which has a higher speed of response than the known devices, is non-microphonic, and is capable of measuring the quantity of radiation.

It is therefore an object of the present invention to provide an improved infra-red radiation detecting and measuring device of the pneumatic type which will possess a much higher speed of response than the known infra-red detectors without any undue sacrifice in sensitivity and without being microphonic or otherwise sensitive to mechanical vibrations.

A further object of this invention is to provide a radiation detecting and measuring device which has a uniform response to radiation of all wave lengths in the infra-red range, as well as to radiation of longer wave lengths, including the shorter radio wave lengths, so long as the dimensions of the detecting device, and the transmitting characteristics of the optical window permit access of radiation of these wave lengths to the radiation absorbing member of the device.

A still further object is to provide a radiation detecting and measuring device which will have a high sensitivity when speed of response is not essential.

A still further object is to provide optico-electrical means of detecting pneumatic pressure changes, this means being capable, at the same time, to effect an optical amplification of the desired infra-red signals, so as to reduce the amount of required electronic amplification.

In accordance with the present invention there is provided a device of the pneumatic type in which changes in incoming radiation produce pressure changes in an inclosed pneumatic system. These pressure changes deform a light-reflecting member, and this deformation is utilized to vary the amount of light reflected to a photosensitive cell, the latter producing corresponding variations in current in the photosensitive cell, which are amplified and are used for indicating indirectly the amount of intercepted radiation.

Referring to the description and drawings, in which,

Figure 1 is a longitudinal sectional view of the infra-red detecting device and its optical system, Figure 2 is an exploded side view of the components of the infra-red detecting device illustrated in Fig. 1, Figures 3 and 4 are vertical sections of modifications of the radiation absorbing cell illustrated in Fig. 1, Figure 5 is a longitudinal sectional view of a modified version of a portion of the device disclosed in Figs. 1 and 2.

Referring to Figs. 1 and 2, the infra-red detector consists of a block 10 preferably made of metal, such as brass or duraluminum, with the remaining elements of the detector fastened to the block; the block also includes the pneumatic portion of the detector. On the radiation receiving side, block 10 is provided with an infrared window which consists of a flat plate or disk 12 made of rock salt or potassium bromide, or any other substance transparent to the infra-red radiation. The window is cemented to the block by means of hard wax or synthetic glues, the joint between the two thus being a gas-tight joint. The central portion of the block, adjacent to the infra-red window 12 is provided with a cylindrical recess 14 with a cylindrical metallic ring 16 tightly fitting into the recess. The outer flat edge of ring 16, which is nearest to window 12, is provided with a radiation absorbing membrane 18 which is the radiation absorbing member of the detector. It is cemented to ring 16, whereupon ring 16 is inserted under pressure into recess 14. The height of ring 16 is approximately one-half of the depth of recess 14 so that film 18 is approximately equidistant from the window 12 and the inner wall of recess 14. A more detailed description of membrane 18 and the process of its fabrication, will be given later in the specification. The recess 14 and ring 16 are centrally positioned in block 10 so that they are symmetrical with respect to the longitudinal axis of block 10 and of the entire heat detecting device. Also, along the same axis, a duct 20 is provided which connects recess 14 with an inner mirror chamber 22, one wall of which is formed by a flexible mirror 24 which will be described later. Mirror 24 is mounted on a mirror carrier 26 which forms the outer cylindrical walls of the inner mirror chamber 22. Mirror carrier 26 is held against block 10 by a window holder 28 which is provided with an optical window 30. Window 30 is cemented to its holder by means of hard wax or synthetic glues, for making a gas-tight joint between the two. Window holder 28 is attached to block 10 by means of mounting screws 32. Mirror carrier 26 is ground, lapped and polished on the mirror side and is ground and lapped on the block side. In mounting mirror carrier 26 and window holder 28, a small amount of soft wax, such as stop-cock grease, is placed between these holders and block 10 for making their joints with block 10 gas-tight. Therefore, the inner chamber 22 is hermetically sealed all around except for ducts 36 and 38 and a capillary duct 54. Duct 54 will be described later. Ducts 36 and 38 interconnect the outer mirror chamber 34 with an annular recess 40 which acts as the discharge cell of the pneumatic circuit. This circuit includes the following essential elements: recess 14, duct 20, inner mirror chamber 22, flexible mirror 24, outer mirror chamber 34, ducts 36 and 38, the discharge cell 40, and a capillary duct 48 which forms a low leakance path between the two halves of the pneumatic circuit which are pneumatically separated by mirror 24. Cylindrical dead-end cells 42, 43, 44, and 45 are connected directly to the gas discharge chamber 40. A duct 46, which consists of a drilled hole with a short piece of glass capillary tube 48 inserted into the hole, connects radiation absorbing chamber 14 with duct 38. The outer surface of glass tube 48 is covered with wax to confine the pneumatic connection between recess 14 and duct 38 to a very small capillary bore of the tube. The outer mirror chamber 34 is also pneumatically connected to a chamber 50 by means of a capillary glass tubing 52 which is inserted and waxed in a hole 54 drilled through the window holder 28. A meniscus lens 55 is cemented in a lens holder 56 by means of hard wax for establishing a gas-tight joint between them. The lens holder 56 is held against block 10 by means of screws 58 with a cylindrical rubber gasket 60 inserted between the two. Gasket 60 is compressed between a ring-shaped extension 62 of the lens holder and a corresponding groove in block 10, so that this joint is also a gas-tight joint. Lens holder 56 is provided with axial apertures 68 and 69. Thus chamber 50 is hermetically sealed all around except for its connection with the outer mirror chamber 34 through capillary 52 and for its connection to the outside through a metallic tube 70 which is soldered in the side wall of the lens holder 56. A line grid 71 is held by a threaded ring 72 having an L-shaped cross-section, against a grid holder 74, and the latter is connected to the lens holder 56 by means of a threaded joint 75 and a lock-nut 76. The optical line grid 76 consists of a glass disk, with a plurality of parallel, transparent surfaces or lines 79 having the same width as the opaque lines which separate the transparent lines. Condenser lenses 82 and 84 form a condensing system for a light source 86 which is positioned at the outer conjugate focus of the condensers 82—84, with light source 86 and condensers 82 and 84 being so spaced from mirror 24, and from each other, that the virtual image of mirror 24, with respect to lens 66, is at the other conjugate focus. A flat mirror 88 faces the lower half of condenser 84 and prevents light from source 86 reaching said lower half of condenser 84. A photo-electric cell 90 is located at the approximate symmetrical point of light source 86 with respect to the reflecting surface 92 of mirror 88. Photo-electric cell 90 is energized by means of battery 94 and the cathode of the cell is connected to a cathode resistor 96. A conductor 97 is connected to the junction point between resistor 96 and the cathode of the cell, and is eventually connected to an amplifier.

The radiation absorbing membrane 18 consists of a collodion membrane made by the well known water surface method; it is laid, when freshly made, on ring 11, to which it will adhere by itself upon its placing on the edge surface of the ring. The outer surface of this membrane, i. e., the surface exposed to the radiation, is then coated with radiation absorbing material; this is accomplished by obtaining a condensate of metal evaporated in a rarified neutral atmosphere or vacuum.

The selection of material for the membrane proper is determined by the ease with which very thin membranes, of the order of fifty or hundred angstrom units in thickness, can be obtained. Collodion is one of such materials. The selection of the metal, used as the radiation absorbing layer deposited on the membrane, is determined by the ease with which this layer can be obtained by evaporating the metal in vacuo, or in a rarified atmosphere, by the radiation absorbing properties of the layer, thus formed, and, in cases where a high speed of response is desired, by the low value of the specific heat of this layer. When neither an extremely high speed of response nor uniformity of response at all infra-red wave lengths is desired, satisfactory radiation absorbing layers can be formed by the evaporation of aluminum in a rarified atmosphere of hydrogen, which results in the deposition of the so-called aluminum black on the membranes placed in the evaporating chamber. When maximum obtainable speeds of response and sensitivity are desired, aluminum, antimony, lead, or other metals can be used, which are conveniently evaporated in vacuo and will form layers having good and uniform radiation absorbing properties over the entire infra-red spectrum. The deposition, in vacuo, of the selected metal on the membrane produces a semi-transparent layer having a characteristic metallic sheen. These metallic layers should have a surface resistance of the order of the absolute impedance of space, which is nearly $120\pi$ ohms divided by $\sqrt{2}$, or, approximately 267 ohms. The layers having this resistance are preferred because they give the maximum overall amount of radiation absorption when the radiation reflected by the back walls of the cell is taken into consideration. In practice, the attainment of a suitable resistance is verified by measuring the transparency to infra-red radiation of this membrane with the metallic deposit on it, and noting that the transmission of infra-red radiation through it is of the order of 35%. It has been found in practice that membranes made of collodion or "Parlodion" and metallic deposits of aluminum are suitable.

The absorbing film formed by the method described above is sufficiently loose and easily deflected by a small differential pressure across it so that the two halves can be considered as being always at the same pressure, and the physical separation effected between the two halves of recess 14 by film 18 can be considered as non-existant, from the pneumatic viewpoint, i. e. the entire recess 14 can be treated as one pneumatic element in all calculations referring to the pneumatic circuit.

Flexible mirror 24, which acts as a link between the pneumatic circuit and the optical system, can be fabricated by placing a freshly made film of collodion on the mirror holder 26, which has been previously lapped and polished to optical flatness on the mirror side. The collodion film can be made by the well known water surface method, and, if deposited shortly after the water has evaporated from the film, a good adherence to holder 26 will be obtained. Subsequently, a suitable metal, such as antimony, is evaporated in a neutral rarified atmosphere having a pressure of approximately one micron of mercury and deposited on one surface of the film. Mirrors made in this manner have a good reflectivity, and remain under permanent tension, so that their deflection from a flat position will be proportional to the differential gaseous pressure existing across their two sides. The thickness of the underlying collodion membrane is not critical, and can be varied between less than 100 Angstroms to many hundreds of angstrom units. The thickness of the evaporated antimony layer can be varied from a few hundred Angstroms to a few thousand Angstroms, and it has been found in practice that both the reflectivity and the surface tension of the finished mirror increase with an increase in the thickness of the antimony deposit. An increase in reflectivity of the flexible mirror will tend to increase the sensitivity of the system whereas an increase in the surface tension of the mirror will tend to decrease it. The best compromise between these two conflicting effects is reached by taking into consideration the other design parameters, such as the volume of recess 14, the pressure of the gas in a pneumatic circuit, and the diameter of flexible mirror 24. For instance, in one type of infra-red detectors designed by me, the volume of recess 14 was 16 cubic millimeters, the diameter of mirror 24 was 1.5 millimeters, its reflectivity of the order of 30% and its surface tension of the order of 600 dynes per centimeter. Had the volume of the cell been appreciably larger, and had I been limited by optical considerations to the use of a flexible mirror of the same diameter, it would have been more efficient to utilize a mirror having a surface tension of the order of 300 dynes per centimeter while having a reflectivity of the order of 20%.

The operation of the detector is as follows. The detector includes two interrelated functional systems, namely, the pneumatic system and the optical system. The pneumatic system begins with the air- or gas-filled radition receiving cell 14, which is sealed on the side exposed to infra-red radiation by gas-tight infra-red window 12, and in the center of which is a radiation receiving membrane 18. The expansion of the gas within the cell, resulting from its increased temperature due to the absorption of infra-red radition by membrance 18, is passed through the central duct of the detector to a flexible mirror 24 which is always under tension. With no radiation intercepted by the radiation absorbing membrane, the flexible mirror represents a plane mirror. Depending upon the balance of radiation emitted and absorbed by the radiation receiving cell, as well as upon the previous state of the cell, the flexible mirror is flexed outwardly with an increase of pressure, or flexed inwardly with a decrease of pressure within the radiation receiving cell, with a concomitant effect on the optical system of the device. The pneumatic circuit is coupled through two side ducts 36 and 38 to the discharge or dead-end cell 40, which is preferably of annular configuration, and therefore surrounds the radiation receiving cell. Equalizing duct 46 insures that flexible mirror 24 will eventually return to its flat rest position, if no further variations occur in the infra-red radiation reaching the cell. Thus the detector can be termed to be an "a. c." device, and that it will be equally insensitive to slow changes in radiation, ambient temperature, and its own temperature. Equalizing duct 46 is also used for evacuating the detector, and its subsequent filling with a desired gas at the desired pressure.

The optical system functions as follows: The light from the fixed source of light 86, which passes through the upper half of line grid 77, is focused on flexible mirror 24 by the upper half of the condensers 82—84. That portion of light which is reflected from flexible mirror 24, and which is allowed to pass through the other half of line grid 77 on its return trip, is focussed on the photo-sensitive cell 90 by the lower half of the condensers. The line grid, which is supported by the adjustable barrel 40, is so positioned with respect to the meniscus lens and the mirror that, when the latter is flat, the line grid is imaged slightly out of focus on itself by means of the meniscus lens-flexible mirror combination, with the images of the light transmitting portions of the line grid coinciding with the light intercepting portions of the same line grid. Therefore, only a slight amount of light reaches the photo-sensitive cell when mirror 24 is flat. As the flexible mirror is made slightly concave or convex in response to variations in the infra-red radiation of the radiation absorbing membrane, the image of the line grid on the grid is either defocused or focused more sharply, and the amount of light reaching the photocell increases or decreases, depending upon the state of the mirror and of the image with respect to the opaque portion of the grid. Thus a modulation of the light reaching the photo-sensitive cell 90 is produced by the slight distortions of the flexible mirror due to the intercepted radiation. The output of the photo-sensitive cell is utilized for indicating the quantity of the intercepted radiation.

It has been stated in the objects of the invention that one of the desirable features of the detector is the lack of microphonism. This is accomplished as follows: The gas which fills the pneumatic circuit enclosed within block 10 has a certain mechanical inertia; therefore, the pneumatic circuit, because of the presence of this gas, will be sensitive to mechanical shocks, which will cause the flexible mirror to assume distentions not corresponding to the actually received infra-red "signals." This undesirable microphonism can be eliminated by making the two portions of the pneumatic circuit to have a common center of gravity. These two halves, separated by the flexible mirror 24, consist on one side of recess 14, duct 20, and chamber 22, and on the other side of chamber 34, ducts 36 and 38, annular discharge cell 40, and the dead-end cells 42—45. The two can be so designed that they have a common center of gravity; i. e., the centers of gravity of the two gas masses in the two halves of the pneumatic circuit will coincide, so that the two gaseous masses are mechanically balanced against each other. When this is the case, translational accelerations imparted to the detector as a whole by some mechanical shock will not result in the creation of differential pressure at the flexible mirror, and only the inertia of the flexible mirror itself will cause the mirror to be deflected one way or the other. Furthermore, even this slight mirror-inertia effect can be compensated by so dimensioning the various portions of the pneumatic circuit that the center of gravity of the first, or central half of this circuit, formed by recess 14, duct 20, and chamber 22, is displaced axially from the center of gravity of the other half, and towards the flexible mirror, by a distance numerically equal to the length of the cylindrical column of the gas in the pneumatic circuit which, having the flexible mirror as a base, would have a weight equal to that of the flexible mirror. Under these circumstances, any axial, linear acceleration, imparted to the system as a whole, will cause a slight differential pressure to appear on both sides of the flexible mirror, and this differential pressure will be exactly that which is needed to impart to this mirror an axial acceleration equal to the axial acceleration of the system as a whole, so that no change in the curvature of the mirror will take place.

In the described balancing system dead-end cells 42—45 can be used as volumetric trimmers, and can be machined after the remaining system has been subjected to a preliminary test. It will be readily realized, when the axial symmetry of the detector is considered, that, because of this axial symmetry, translational accelerations, in the direction normal to the axis of the detector, as well as rotational accelerations about any instantaneous axis of rotation which crosses the axis of symmetry of the detector, will not generate any differential pressure across the flexible mirror, and will, therefore not produce any microphonism.

The choice of the gas filling the pneumatic system, and of the pressure of said gas, is determined essentially by the maximum speed of response of the detector and by the depth and area of the radiation absorbing cell, whereas the area of this cell is determined by the intended use of the device, and, for the sake of sensitivity, is made no larger than is demanded by the use. For instance, if maximum obtainable speed of response is desired, the use of a gas possessing high thermal conductivity, such as helium, is preferable, and a low pressure of helium will minimize the effective specific heat of the thermally active elements of the cell, i. e., the radiation absorbing film and the gas. However, since the heat conductivity of most gases is independent of gas pressure, in the involved pressure range, decreasing the amount of gas within the cell will affect the speed of response only because of the lowered specific heat of the more rarified gas, and a point will be reached, at which the specific heat of the radiation absorbing film is paramount in determining the speed of response of the cell. Decreasing the gas pressure from then on would only result in a lowered sensitivity without appreciable gain in speed. When this point is reached, an increased speed of response could only be obtained by decreasing the depth of the radiation absorbing cell. Conversely, if maximum obtainable sensitivity is desired, and the speed of response is not essential, a gas of low thermal conductivity such as xenon can be used to good advantage, and the depth of the cell can be increased until a point is reached where a greater depth would only serve to increase the amount of unused cell space, without increasing appreciably the average temperature rise of the gas due to the absorption of radiation.

In other words, such factors as the nature and pressure of the case, and cell depth, represent design parameters which will vary with the intended use of the device.

The evacuation of the pneumatic circuit, introduction of the desired gas and adjustment of gas pressure to the desired value are all accomplished through the tube 70, which is later sealed, and in this operation, capillaries 46 and 52 make it possible that all portions of the pneumatic circuit, as well as chamber 50, will be evacuated and refilled with the desired gas at the desired pressure.

For an additional description of the theory of my detector, as well as for additional details on its construction and the experimental techniques involved in its construction, reference is made to the two following articles which are made a part of this disclosure: (a) Theoretical Consideration in Heat and Infra-red Detection with Particular Reference to the Pneumatic Detector, by Marcel J. E. Golay, Review of Scientific Instruments, vol. 18, pages 347 to 356 inclusive, May 1947; (b) A Pneumatic Infra-red Detector, by Marcel J. E. Golay, Review of Scientific Instruments, vol. 18, pages 357 to 362 inclusive, May 1947.

In concluding the description of the detector disclosed in Figs. 1 and 2 it should be mentioned that the drawings and the specification disclose one type of the preferred embodiment of the invention, and that reasonable modifications are possible. Thus it has been stated that the radiation absorbing membrane 18 can be made of an organic, flexible film with a metallic coating deposited on this film. The same results may be obtained by eliminating the organic film after the deposition of the metallic layer by subsequently dissolving the organic film. In this case the radiation absorbing membrane will consist only of a metallic film. Likewise mirror 24, which has been described as a thin plastic membrane over which a layer of antimony has been deposited in a partial vacuo, can be replaced with a thicker collodion or other plastic film without any metallic deposit on it. In this case the thickness of the collodion film is made to be approximately a quarter of the average wave length of the photo active radiation of the light source 86, for obtaining the maximum amount of light reflection from a plastic film alone, devoid of a metallic layer, said wave length being referred to said plastic film and not to air or vacuum.

It has been also stated that the radiation absorbing member 18 comprises a single membrane because of the mechanical simplicity of such a structure, and also because it possesses least specific heat. When the speed of response is less important than the sensitivity of response, the number of the radiation absorbing membranes can be increased. This is illustrated in Figs. 3 and 4, with two membranes 300 and 302 illustrated in Fig. 3, and three membranes 400, 402 and 404 in Fig. 4. In both figures the absorbing membranes are placed preferably in the center of radiation absorbing cell 14 and are separated from each other by a distance at least equal to the wave length of the longest wave length radiation under observation. In Fig. 3, the radiation absorbing membranes 300 and 302 are separated from each other by a ring 303 and, in Fig. 4, the membranes are separated by rings 403 and 405. For the sake of clarity of the drawing, these separations were enlarged in these figures. When only two membranes are used, the desired separation between the two can be obtained by placing them in direct contact with each other, i. e. face to face, and relying on their crinkled shape for obtaining the separation sought. When more than two radiation absorbing members are used, their separation can be obtained by using the same method as that of Fig. 3, or by placing two membranes on two rings whose lengths are nearly one half the depth of the cell, and by placing a third membrane on a very thin ring which is then placed between the other two rings, so that the membrane of the thin ring will partially touch one of the other membranes, the crinkled state of the membranes being relied upon to keep them separated over the greater part of their areas. When a plurality of membranes is used, their electrical resistances are made to follow approximately a geometric progression, with the resistance of the inner membrane being lowest, and of the outer membrane—highest. Thus, in Fig. 3 the absorbing membrane 300 should have a resistance between the two sides of any square of the order of 267 ohms, and the outer radiation absorbing member 302 should have a resistance between the two sides of any square of the order of 560 ohms. In the case of three radiation absorbing membranes, Fig. 4, or even a greater number, the resistances of the radiation absorbing member 400, 402 and 404 will be 267, 565 and 1200 ohms respectively, with the additional radiation absorbing membranes, if such are used, having progressively higher resistances.

Figure 5 discloses a modification of the radiation detecting and measuring cell disclosed in Fig. 1. The main changes reside in the elimination of glass window 30 and its holder 28, shortening of duct 20, and general simplification of the pneumatic system of the radiation absorbing chamber and mirror holder which permit simpler shop practices in the manufacture of the entire cell. Also, the thermal paths between various metallic parts which house the pneumatic system have been shortened, producing closer thermal integration of the entire structure.

Referring to Fig. 5, an infrared window 500 is now mounted in a plate 502 which is provided with a central bore 504 which forms the outer part of the radiation absorbing cell 507. Plate 502 is also provided with a concentric recess which is used for housing a radiation absorbing film carrier 506, the radiation absorbing film being placed across a hemispherical recess 505 in carrier 506, and which forms the inner half of radiation absorbing cell 507. Carrier 506 is also provided with a bore 510. This bore matches a bore 511 in a mirror carrier 512. As before, the mirror carrier is provided with an inner mirror chamber. A flexible mirror 514 forms one wall of this chamber. The mirror-holder 512 and plate 502 are held in close mechanical engagement with respect to each other by a threaded cap 516. A gas-tight joint exists between plate 502 and mirror-carrier 512. The threaded cap 516 is provided with ducts 517 and 519 and a central conical opening 518; the latter is aligned with a similar opening 528 in a meniscus lens holder 524. Meniscus lens 526 performs the same optical function as the same lens in Figure 1. It is waxed into a recess provided for this purpose in holder 524 so that the lens also performs the additional function of acting as a gas-tight wall closing the outer mirror chamber formed by the conical openings 518 and 528. The outer mirror chamber communicates with an annular discharge cell 522, provided in plate 502, through an annular space 515 and through two symmetrically located slots 521 and 527 milled in lens carrier 524. As in the case of Figure 1, this pneumatic connection between the outer mirror chamber and the discharge cell 522 constitutes a very low pneumatic impedance connection. Plate 502 is bolted to lens carrier 524 by means of a plurality of bolts, such as bolt 529, only one bolt appearing in Fig. 5. A gas-tight connection exists between plate 502 and lens holder 524 because of the presence of a gasket 531, which is slipped into a groove provided in plate 502. The entire pneumatic system is evacuated, and then filled with any desired gas, through a metallic tube 520 and a capillary tube 513, the latter representing a low leakage path between the two parts of the pneumatic system. The outer end of tube 520 is soldered at 525 upon the completion of the gas-filling process. In order to establish close thermal integration between plate 502 and lens holder 524, their engaging surfaces are so finished that, upon assembly, a contact is established first along annular surface 523, and contact between plate 502 and lens holder 524 along annular surface 533 is established only after bolts 529 have been so firmly engaged with lens holder 524 that plate 532 has been slightly deformed. The remaining elements of the radiation detecting and measuring cell are identical to the corresponding elements in Fig. 1, except that the line grid 530 is now waxed to a grid holder 532. The position of the grid holder along the longitudinal axis of the cell can be adjusted by changing the threaded engagement between the holders 532 and 524. The optical system 537 is identical to the optical system illustrated in Fig. 1 and is therefore illustrated in Figure 5 only in the block form. A housing 536 is provided for accommodating the optical system. This housing forms a threaded engagement with holder 524.

From the description of Fig. 5, it follows that the construction of the radiation absorbing chamber has been considerably simplified; the duct 510—511 has been shortened, and, because of the dimensioning of the pneumatic system, and of the firm contact achieved along surface 523, a close overall thermal integration throughout the cell has been achieved. This being the case, the calorific inertia of the entire housing of the pneumatic system has been reduced, while the transmission of heat between the various portions of said housing has been improved, with the result that smaller temperature differentials between the various parts of said housing will occur when this housing is subjected to changes in ambient temperature.

What is claimed is:

1. A method of measuring changes in radiant energy which includes the steps of converting said radiant energy changes into corresponding increments in kinetic energy of gas, converting said corresponding increments of kinetic energy into changes of light-transmission-characteristic of an optical path to obtain modulations of light, and converting said modulations of light into substantially proportional modulations of electrical energy.

2. A radiation absorbing pneumatic cell comprising a cavity having openings at two ends and having radiation reflecting walls, one of said ends being pneumatically closed by a radiation transparent window, and a radiation absorbing element positioned across said cavity subdividing said cavity into two substantially equal halves, said radiation absorbing element comprising an electrical resistance sheet having a resistance between two opposite sides of any square cut out of said sheet which is of the order of 270 ohms.

3. A radiation absorbing cell as defined in claim 2 in which said radiation absorbing element comprises a plurality of electrically resistive sheets separated by distances at least equal to the longest wave length of the radiation it is desired to intercept.

4. A radiation absorping cell as defined in claim 2 in which said radiation absorbing element includes an additional electrical resistance sheet nearer said window having a resistance of the order of 570 ohms.

5. A radiation absorbing cell as defined in claim 2 in which said radiation absorbing element comprises a plurality of metallically coated films, having negligibly small pneumatic impedance.

6. A radiation absorbing cell as defined in claim 2 in which said radiation absorbing element comprises a plurality of separated, metallically coated films, with the surface resistance of the film nearest to said window having a maximum electrical surface resistance, the film farthest away from said window having minimum surface electrical resistance respectively, and the values of the resistance of all films forming a geometrically varying progression.

7. A radiation absorbing cell as defined in claim 2 in which said radiation absorbing element includes additional electrical resistance sheets nearer said window and having greater resistance, and the resistance of the successive films following approximately a geometric progression with the resistance of a succeeding film being approximately double the resistance of a preceding adjacent film.

8. A radiation absorbing cell as defined in claim 2 in which said radiation absorbing cell comprises a flexible membrane and a metallic coating attached to said membrane, said coated membrane having a negligibly small pneumatic impedance, whereby both halves of the cell separated by said membrane can be considered as one single pneumatic element.

9. A radiation absorbing cell as defined in claim 2 in which said radiation absorbing element comprises a plurality of separated films, the values of electrical surface resistance of said films substantially following a geometric progression with respect to each other, with the film next to said window having the highest resistance.

10. A radiation absorbing membrane which comprises a flexible, organic film whose thickness is of the order of 50 angstrom units, and a metallic layer adhering to said organic film, the radiation transparency of said metallic layer being of the order of 34 per cent.

11. A radiation absorbing membrane as defined in claim 10 in which said organic film is a collodion film, and said metallic layer is an aluminum film condensed on said collodion film.

12. A radiation absorbing pneumatic cell having openings at two ends, one of said open ends being pneumatically closed by a flat radiation transparent window, a radiation absorbing membrane positioned in said cell, said membrane subdividing said cell into two substantially equal halves, the plane of said membrane being substantially parallel to the plane of said window, said membrane comprising a plastic film with a metallic layer deposited on one surface of said film, said metallic layer being defined by the resistance, R, between two opposite sides of any square of said layer, said resistance being in the neighborhood of $$R=\frac{Z_s}{\sqrt{2}}=\text{approximately } 267 \text{ ohms}$$

where $Z_s$ is the impedance of space, which is approximately 377 ohms, a gas filling said cell, said window passing the radiant energy onto said membrane, and said membrane converting a substantial part of said radiation into thermal energy, said thermal energy being conducted to said gas, and causing a change in pressure of said gas, and an opening in said cell for conveying said change in pressure to a pneumatic element connected to said cell.

13. A radiation absorbing pneumatic cell comprising a cylindrical cavity having radiation reflecting walls, said cavity being pneumatically closed by a radiation transparent window, a cylindrical metallic ring tightly fitting into said cylindrical cavity, and a radiation absorbing membrane stretched across that end of said ring which is nearest to the center of said cavity, the longitudinal dimension of said ring being substantially one half the longitudinal dimension of said cavity.

14. A radiation detection device comprising a first—radiation absorbing—chamber, a radiation absorbing membrane within said first chamber, a second—inner mirror—chamber, a low pneumatic impedance connection between said first and second chambers, a flexible mirror comprising one wall of said second chamber, a third —outer mirror—chamber; a fourth—gas discharge—chamber; a low pneumatic impedance connection between said third and fourth chambers, and a gas filling all of said chambers and said connections, the center of gravity of gas within said first and second chambers and their connection substantially coinciding with the center of gravity of gas within said third and fourth chamber and their connection, whereby the gaseous masses on the two sides of said mirror are incapable of producing any microphonic effects on said mirror.

15. A radiation detection device comprising a first—radiation absorbing—chamber, a radiation absorbing membrane within said first chamber, a second—inner mirror—chamber, a low pneumatic impedance connection between said first and second chambers, a flexible mirror comprising one wall of said second chamber, a third—outer mirror—chamber; a fourth—gas discharge—chamber; a low pneumatic impedance connection between said third and fourth chambers, and a gas filling all of said chambers and connections, the center of gravity of gas within said third and fourth chambers and the connection therebetween being positioned at a first point along a line perpendicular to the plane of said mirror, and the center of gravity of gas within said first and second chambers and the connection therebetween being positioned at a second point which is also along said line, said first and second points being displaced from each other along said line a distance equal to the height of a cylinder of gas having said mirror as a base and a weight equal to that of said mirror, whereby the differential pressure exerted on both sides of said flexible mirror, when said device is imparted a translational acceleration, will cause said flexible mirror to assume an acceleration which is equal to the component of said translational acceleration in a direction normal to said mirror, with the mirror assuming no flexural distortion on account of said translational acceleration.

16. In a pneumatic system which is separated into two parts by a membrane, an equalizing duct between said parts, whereby the gas temperatures and pressures in said two parts are maintained substantially equal when said two parts are subjected to long period thermal changes tending to produce a differential pressure across said membrane, the centers of gravity of the respective gas masses in said two parts being substantially in coincidence, whereby the differential pressure across said membrane is made independent of short period translational accelerations of said pneumatic system.

17. In a pneumatic system which is separated into two parts by a flexible membrane, the fixed periphery of which is in a plane, means for maintaining the gas pressures and temperatures in said two parts substantially equal when said parts are subjected to long period thermal changes tending to produce a differential pressure across said membrane, the centers of gravity of the respective gas masses in said two parts being on a line normal to said plane, the distance between said centers of gravity being equal to the height of a cylinder of said gas having said membrane as a base and having a weight equal to the weight of said membrane, and the direction of displacement of the centers of gravity of the respective parts of said pneumatic system being opposite to the direction of displacement of the respective surfaces with which they are in contact, whereby the distention of said membrane is made independent of short period translational accelerations of said pneumatic system.

18. In a detecting device, a mirror distorted in response to gaseous pressure, a source of light directed towards said mirror, a light transmitting grid in the path of light between said source and said mirror, a photo-sensitive cell responsive to light reflected by said mirror and again transmitted by said grid, means including said mirror to reflect light from said source transmitted by said grid back to said grid and to nearly focus the areas of transmission from said source upon the areas of non-transmission to said cell, distortion of said mirror modifying the focus of said respective areas to serve as a pressure responsive light valve between said source and said cell.

19. A radiation detecting device as defined in claim 18 in which said mirror comprises a flexible organic film and a layer of metallic antimony deposited on one surface of said film.

20. A radiation detection device including a flexible mirror which is flexed in response to changes in radiation intercepted by said device, a steady source of light directed towards said mirror, a grid between said source and said mirror, and a lens between said grid and said flexible mirror, said lens and said flexible mirror forming a variable focus system the focal plane of which is nearly in coincidence with said grid when said flexible mirror is in its flat state, said lens and flexible mirror combination serving to image the clear portions of said grid on the opaque portions of the same grid, and a photo-sensitive cell positioned to receive the light reflected by said flexible mirror through said grid.

21. A radiant energy detector comprising; coacting pneumatic and optical systems, said pneumatic system comprised of a radiant energy receptor film, an optically reflecting film, a chamber therebetween, and another chamber adjacent to said reflecting film, the latter chamber having several times the volume of the former chamber, said optical system adapted to reproduce movement of said reflecting film as a change in illumination.

22. A radiant energy detector comprising: coacting pneumatic and optical systems, said pneumatic system consisting of an outer member, a radiant energy permeable member, a chamber closely therebehind, a thin radiation-absorbing film closely therebehind, an annular shaped carrier for said absorbing film closely therebehind and a closure portion therebehind, said film, carrier, and closure forming a chamber coaxial with respect to the aforementioned chamber, an annular carrier member closely behind said closure portion, a thin reflecting film attached to the rear of said carrier, and a locking ring bearing upon the last said carrier and secured to said outer member, said optical system adapted to reproduce movement of said reflecting film as a change in illumination.

23. A radiant energy detector comprising; coacting pneumatic and optical systems, said pneumatic system comprised of a radiant energy receptor film, an optically reflecting film, a chamber therebetween, and another chamber adjacent to said reflecting film, the latter chamber having a volume approximately twenty times the volume of the former chamber, said optical system adapted to reproduce movement of said reflecting film as a change in illumination.

24. A radiation detecting device as defined in claim 18 in which said mirror comprises a flexible, organic film and a metallic layer deposited on one surface of said film.

25. A radiation detecting device as defined in claim 18 in which said mirror consists of a plastic film.

26. A radiation detecting device as defined in claim 18 in which said mirror comprises a plastic film having a thickness of the order of one-quarter of the average wave length of the photo-active radiation emitted by said source, said wave length being the wave length within said film.

27. A radiation detecting device including a flexible mirror which is flexed in response to changes in radiation intercepted by said device, a steady source of light, a light-condensing system in a light-intercepting relationship with respect to said light, a grid in the path of the beam of light refracted by said condensing system, said grid being positioned between said condensing system and said mirror, a fixed mirror between said source of light and said condensing system, said fixed mirror blocking a portion of the light beam which would otherwise reach said condensing system and said grid, a photosensitive cell, and a lens between said grid and said flexible mirror, said lens and said flexible mirror forming a variable focus system the focal plane of which is nearly in coincidence with said grid when said flexible mirror is in its flat state, said lens and flexible mirror combination serving to image the clear portions of said grid on the opaque portions of the same grid, said fixed mirror and said photosensitive cell being positioned with respect to the beam of light reflected by said flexible mirror to reflect said beam onto said photosensitive cell.

28. In a detecting device, a first variable curvature mirror, a source of light, a light-condensing system, said first mirror and said source being at the respective conjugate foci of said light-condensing system, a light-transmitting grid between said condensing system and said flexible mirror, said grid comprising a recurrent series of opaque and transparent areas, a second mirror between said source and said light-condensing system, said second mirror having its back facing said source of light and its reflecting surface facing said condensing system whereby said second mirror permits only a partial exposure of said light-condensing system to the light from said source, a lens between said grid and said first mirror, said lens and said first mirror forming a variable focus system—responsive to said variable curvature—the focal plane of which is substantially in coincidence with said first mirror when said first mirror is in its neutral, flat state, said lens and said first mirror normally imaging one type of areas of said grid on the other type of areas of said grid when said mirror is in said flat state, and a photosensitive cell in light-intercepting relationship with respect to said second mirror, said photosensitive cell responding to the light modulations produced by said first mirror and said grid in response to the variable curvatures of said first mirror, with the current flowing through said photosensitive cell being substantially proportional to the variations in said curvature.

29. A radiation detecting and measuring device including a radiation absorbing pneumatic cell, a gas within said cell, a flexible mirror responsive to the increments in gaseous pressure within said cell in response to the incremental changes in radiation intercepted by said cell, said increments in pressure being substantially proportional to the incremental changes in radiation, a source of light directed toward said mirror, a light transmitting grid between said source and said mirror, a photo-sensitive cell, said grid being positioned with respect to each other to act as a pressure-responsive light-valve between said source and said photosensitive cell, the light modulations of said light-valve and the corresponding current modulation in said photosensitive cell being substantially proportional to said incremental changes in radiation, whereby said device is capable of measuring quantitatively said incremental changes in radiation.

30. A radiation detecting and measuring device comprising a first—radiation absorbing—chamber, a radiation absorbing membrane within said first chamber, a second—inner mirror—chamber, a low pneumatic impedance connection between said first and second chambers, a flexible mirror comprising one wall of said second chamber, a third—outer mirror—chamber; a fourth—gas discharge—chamber; a low pneumatic impedance connection between said third and fourth chambers, a gas filling all of said chambers and connections, said flexible mirror being flexed in response to changes in radiation intercepted by said device, a steady source of light directed toward said mirror, a grid in the path of the beam of light between said source and said mirror, and a lens between said grid and said flexible mirror, said lens and said flexible mirror forming a variable focus system—responsive to the variations in radiation intercepted by said device—the focal plane of which is nearly in coincidence with said grid when said flexible mirror is in its flat state, said lens and flexible mirror combination serving to image the clear portions of said grid on the opaque portions of the same grid and a photo-sensitive cell responsive to light reflected through said grid by said mirror.

31. In a radiation detector, an inclosed radiation absorbing gas-filled cell, a radiation absorbing member within said cell, a pneumatic system comprising a plurality of ducts and discharge cells, a flexible mirror within said pneumatic system, a lens, a line grid, means for focusing a light source through said grid and said lens upon said flexible mirror, said mirror reflecting said light back through said lens and partially back through said grid, and means for interpreting the variations in the reflected light, after passage through said grid, in terms of variations of said radiation.

32. In a radiation detector, as defined in claim 31, in which said radiation absorbing member is an electrically conductive metallic sheet.

MARCEL J. E. GOLAY.

REFERENCES CITED

The following references are of record in the file of this patent:

UNITED STATES PATENTS

| Number | Name | Date |
|---|---|---|
| 2,115,578 | Hall | Apr. 26, 1938 |
| 2,349,715 | Francis | May 23, 1944 |
| 2,424,976 | Golay et al. | Aug. 5, 1947 |

OTHER REFERENCES

Cioffi, Article in Bell Labts. Record, Feb. 1927, pp. 201–202.